(12) United States Patent
Forster

(10) Patent No.: US 11,504,811 B2
(45) Date of Patent: Nov. 22, 2022

(54) APPARATUS AND METHOD OF ADAPTIVE LASER CUTTING CONTROL BASED ON OPTICAL INSPECTION

(71) Applicant: Avery Dennison Retail Information Services, LLC, Mentor, OH (US)

(72) Inventor: Ian J. Forster, Chelmsford (GB)

(73) Assignee: Avery Dennison Retail Information Services LLC, Mentor, OH (US)

(*) Notice: Subject to any disclaimer, the term of this patent is extended or adjusted under 35 U.S.C. 154(b) by 635 days.

(21) Appl. No.: 16/225,548

(22) Filed: Dec. 19, 2018

(65) Prior Publication Data

US 2019/0202006 A1 Jul. 4, 2019

Related U.S. Application Data

(60) Provisional application No. 62/611,458, filed on Dec. 28, 2017.

(51) Int. Cl.
*B23K 26/38* (2014.01)
*B23Q 15/02* (2006.01)
*B23K 26/064* (2014.01)
*B23K 26/70* (2014.01)
*B23K 26/03* (2006.01)
*G06K 19/077* (2006.01)

(52) U.S. Cl.
CPC ............ *B23K 26/38* (2013.01); *B23K 26/032* (2013.01); *B23K 26/064* (2015.10); *B23K 26/702* (2015.10); *B23Q 15/02* (2013.01); *G06K 19/07749* (2013.01); *G05B 2219/37205* (2013.01); *G05B 2219/45041* (2013.01)

(58) Field of Classification Search
CPC .... B23K 26/38; B23K 36/064; B23K 26/702; B23K 26/032; G06K 19/07749; G05B 2219/45041; G05B 2219/37205; H05K 1/0298; H05K 3/4652; H05K 3/22; H05K 3/26; H05K 2203/06
See application file for complete search history.

(56) References Cited

U.S. PATENT DOCUMENTS 4,937,422 A 6/1990 Nagamine et al.
5,614,115 A * 3/1997 Horton .................. B26D 5/007
700/166

(Continued)

FOREIGN PATENT DOCUMENTS

CN 105290622 2/2016

OTHER PUBLICATIONS

International Preliminary Report on Patentability dated Jun. 30, 2020 issued in corresponding IA No. PCT/US2018/066427 filed Dec. 18, 2018.

(Continued)

*Primary Examiner* — Brian W Jennison

(57) ABSTRACT

An apparatus and method of improving the stability and repeatability of the laser cutting of an RFID antenna is disclosed. The present invention provides direct feedback from an optical inspection of the cutting process to the control system to determine the shape of the RFID antennas that are being cut and compare the same to the desired RFID antenna shape or pattern. When appropriate, the present invention enables a user to employ both short term and long term feedback data to make modifications to the laser cutting process to improve the same and reduce waste.

13 Claims, 5 Drawing Sheets

(56) References Cited

U.S. PATENT DOCUMENTS

| | | | |
|---|---|---|---|
| 5,777,880 A * | 7/1998 | Bowen | G05B 19/4083 |
| | | | 700/134 |
| 7,014,729 B2 * | 3/2006 | Grabau | B31D 1/028 |
| | | | 156/290 |
| 2007/0031993 A1 * | 2/2007 | Nemets | H01L 23/544 |
| | | | 257/E23.179 |
| 2015/0144379 A1 * | 5/2015 | Petsch | H05K 3/027 |
| | | | 174/251 |
| 2017/0235294 A1 | 8/2017 | Shapiro et al. | |
| 2017/0270434 A1 * | 9/2017 | Takigawa | B23K 26/21 |

OTHER PUBLICATIONS

M.Y. Huang et al.: "A knowledge-based adaptive control environment for an industrial laser cutting system," Optics and Lasers in Engineering, vol. 21, No. 5, Jan. 1, 1994, pp. 273-295.

International Search Report and Written Opinion dated Mar. 15, 2019 issued in corresponding IA No. PCT/US2018/066427 filed Dec. 18, 2018.

J.V. Abellan et al.: "Adaptive Control Optimization of Cutting Parameters for High Quality Machining Operations based on Neural Networks and Search Algorithms," Advances in Robotics, Automation and Control, Oct. 1, 2008, I-Tech, Vienna, Austria, 21 pages.

\* cited by examiner

APPARATUS AND METHOD OF ADAPTIVE LASER CUTTING CONTROL BASED ON OPTICAL INSPECTION

CROSS-REFERENCE TO RELATED APPLICATION(S)

The present application claims priority to and the benefit of U.S. provisional utility patent application No. 62/611,458 filed Dec. 28, 2017, which is incorporated by reference herein in its entirety.

BACKGROUND

The present invention relates generally to an apparatus and method of improving the stability and repeatability of the laser cutting of a radio-frequency identification ("RFID") antenna. Specifically, the apparatus and method provide direct feedback from an optical inspection of the cutting process to the control system to determine the shape of the lines that are cut, and compare the same to the desired shape.

RFID (Radio Frequency Identification) uses magnetic, electric or electromagnetic fields transmitted by a reader system to identify itself and in some cases, provide additionally stored data. RFID tags typically include a semiconductor device commonly called the "chip" on which are formed a memory and operating circuitry, which is connected to an antenna. Typically, RFID tags act as transponders, providing information stored in the chip memory in response to a radio frequency ("RF") interrogation signal received from a reader, also referred to as an interrogator. In the case of passive RFID devices, the energy of the interrogation signal also provides the necessary energy to operate the RFID device.

Laser cutting the peripheral shape of an RFID antenna can be both difficult and time consuming. For example, the web that the aluminum foil is mounted on can stretch or distort, and the accuracy of the beam deflectors may change with the angle between the intended cutting point and the center of the head. Further, how the laser system is able to adapt to cutting a moving pattern can be difficult, and registering the laser to cut printed adhesive shapes can be difficult as well.

The present invention discloses an apparatus and method of providing direct feedback from an optical inspection of the cutting process to the control system of a laser cutting system. The laser cutting system provides direct feedback from an optical inspection of the cutting process to the control system via an adaptive algorithm to determine the shape of the lines that are cut and compare the same to the desired shape.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises an apparatus and method of providing direct feedback from an optical inspection of the cutting process to the control system. Specifically, the laser cutting system comprises a control system and an optical inspection system. The optical inspection system accurately determines the shape of the lines that are cut and compares that to the desired shape. Then, an adaptive algorithm utilizes the data from the optical inspection system to provide direct feedback to the laser cutting system to ensure that the desired pattern/shape is achieved.

In another embodiment, the output from one or more inspection systems which is related to the cut dimensions can also be used to assist in the correction of the cutting pattern via an algorithm running on the system controller. Additionally, the data used may be a combination of immediate data to correct short term variations due to such factors as material variations and that can be used to change the antenna as it is being produced, and long term data to optimize the quality of the design to achieve a desired result.

In a further alternative embodiment of the present invention, the basic correction data from one laser cutting system can be used by a second laser cutting system to create a shared pre-distortion system. The initial data acts as a starter for the optimization routine on the second laser cutting system, thereby reducing the amount of time required to converge on a solution and the amount of waste generated by the second laser cutting system.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
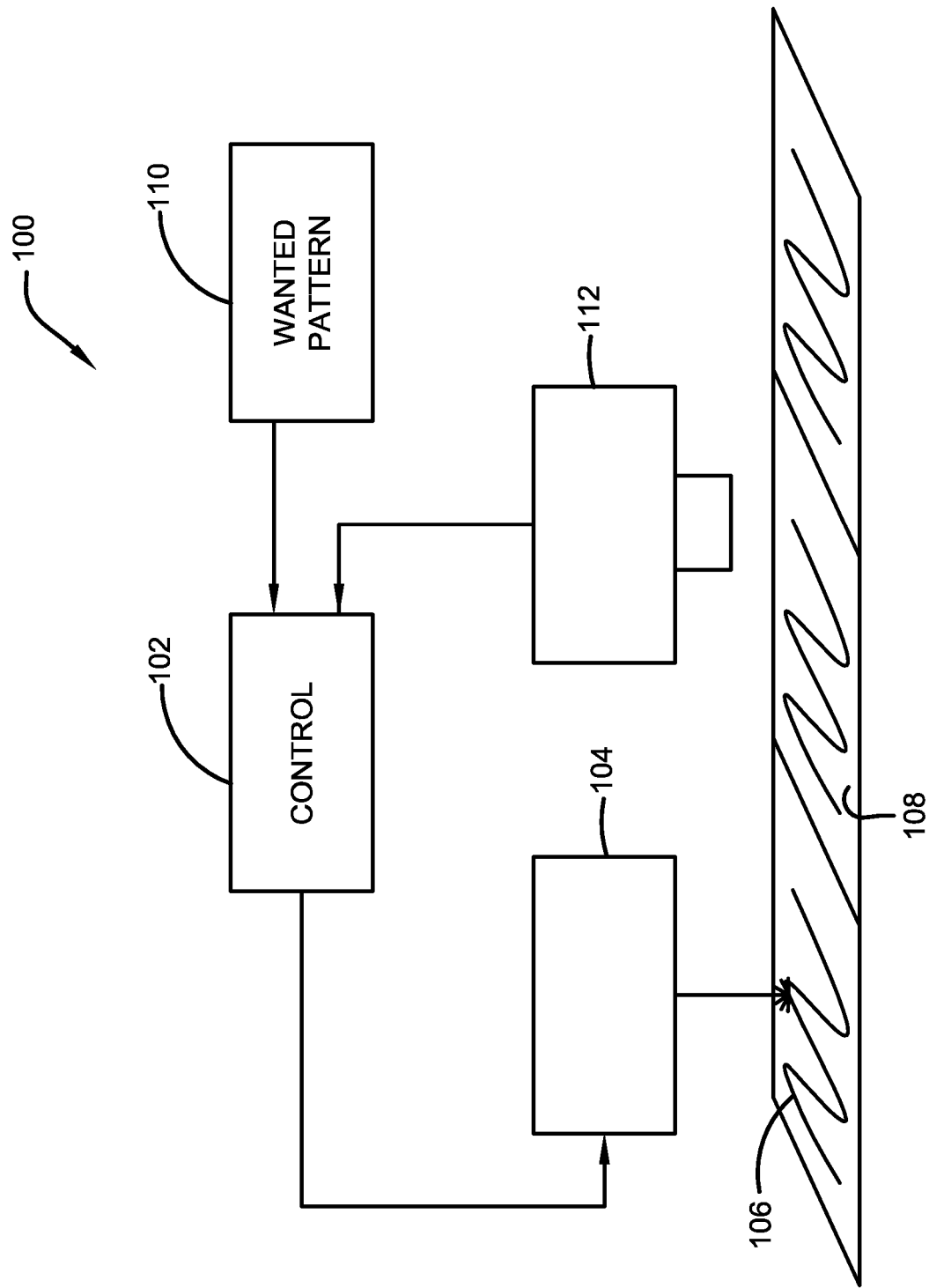
FIG. 1 illustrates a schematic perspective view of the laser cutting system with an optical inspection system communicating with the control system in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses both an apparatus and a method of improving the stability and repeatability of the laser cutting of an RFID antenna. The apparatus and method provide direct feedback from an optical inspection of the cutting process to the control system to determine the shape of the lines that are cut and compare the same to a desired RFID antenna shape. When appropriate, the present invention also enables a user to employ both short term and long term feedback data to make modifications to the laser cutting process to improve the same.

Referring initially to the drawings, FIG. 1 illustrates a laser cutting system 100 comprising a control system 102 that provides instructions to the laser 104 of the laser cutting system 100 to cut an RFID antenna 106 on a web 108. The control system 102 further comprises a predetermined desired pattern 110 and an optical inspection system 112 that performs an optical inspection of the cutting process. The optical inspection system 112 then provides direct feedback from the cutting process to the control system 102 on the shape of the antennas 106 actually being cut and compares the same to the desired RFID antenna pattern 110. Specifically, an adaptive algorithm is utilized to provide feedback to the laser cutting system 100 to ensure that the predetermined wanted pattern 110 is being achieved.

Additionally, the material utilized for the web 108 is typically aluminum foil or any other suitable material for an RFID antenna 106 as is known in the art. Typically, the web 108 can be any suitable size, shape, and configuration as is known in the art without affecting the overall concept of the invention. One of ordinary skill in the art will appreciate that the shape and size of the web 108 as shown in FIG. 1 is for illustrative purposes only and many other shapes and sizes of the web 108 are well within the scope of the present disclosure. Although dimensions of the web 108 (i.e., length, width, and height) are important design parameters for good performance, the web 108 may be any shape or size that ensures optimal performance during use.

Figure 2:
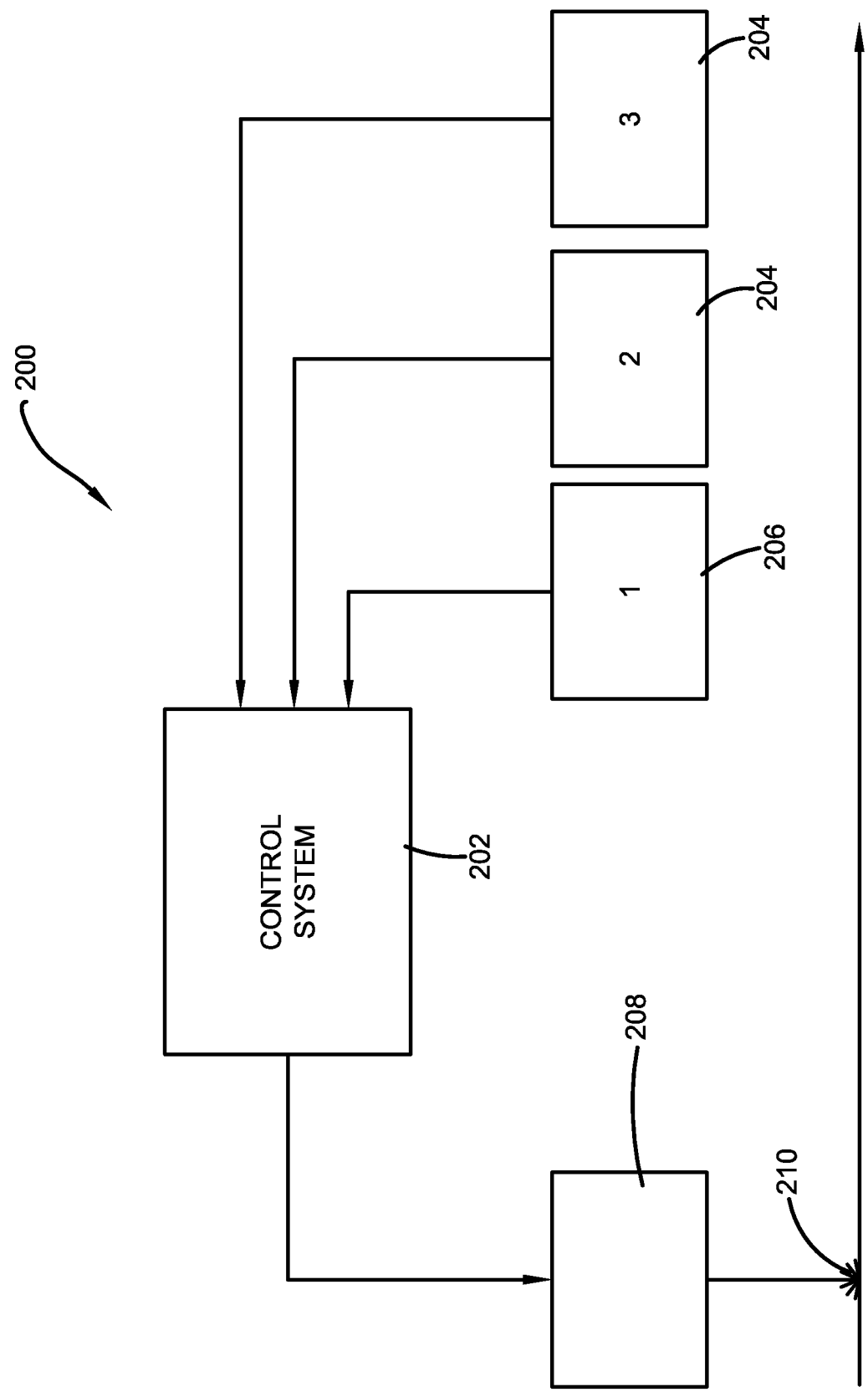
FIG. 2 illustrates a schematic view of the laser cutting system with a control system comprising a data gathering system and an inspection system in accordance with the disclosed architecture.

In another embodiment as shown in FIG. 2, the laser cutting system 200 comprises a laser 208 and a control system 202 that compares the desired antenna design with the antenna design being produced. The control system 202 utilizes at least one inspection data system 204 and a data gathering system 206 to output data related to the cut dimensions. Specifically, the output data from the one or more inspection data systems 204 and/or data gathering systems 206 is related to the cut dimensions and can also be used to assist in the correction of the cutting pattern. The output data is utilized via an algorithm running on the control system 202, or on a remote system such as a computer. The inspection data systems 204 measure some aspect of the RFID antenna device. For example, the inspection data system 204 can measure using RF methods, a resonant frequency or near field/far field RF performance.

Furthermore, the information used to adapt the cutting 210 may be immediate, that is the information may be used to change the RFID antennas as they are being produced. Additionally, the information used to adapt the cutting 210 could be based on historical statistical cut data (such as averages) accumulated over time to optimize the cutting process (i.e., move towards a statistical center line of a spread of data points or target data point), and reduce the variability in shape of produced RFID antennas. The information used to adapt the cutting process 210 may also be based on data that is gathered over a longer timeframe that may include deployment of the RFID tags into a customer application to determine RFID tag read rates, or quality of the RFID tags when delivered through the entire supply chain. Stated differently, the data used to modify the cutting process of the present invention is not necessarily limited to a comparison of the shape of the RFID antennas being cut vs. a desired shape, but may also include data pertaining to the performance of said RFID antennas in the field vs. a desired performance level.

Figure 3:
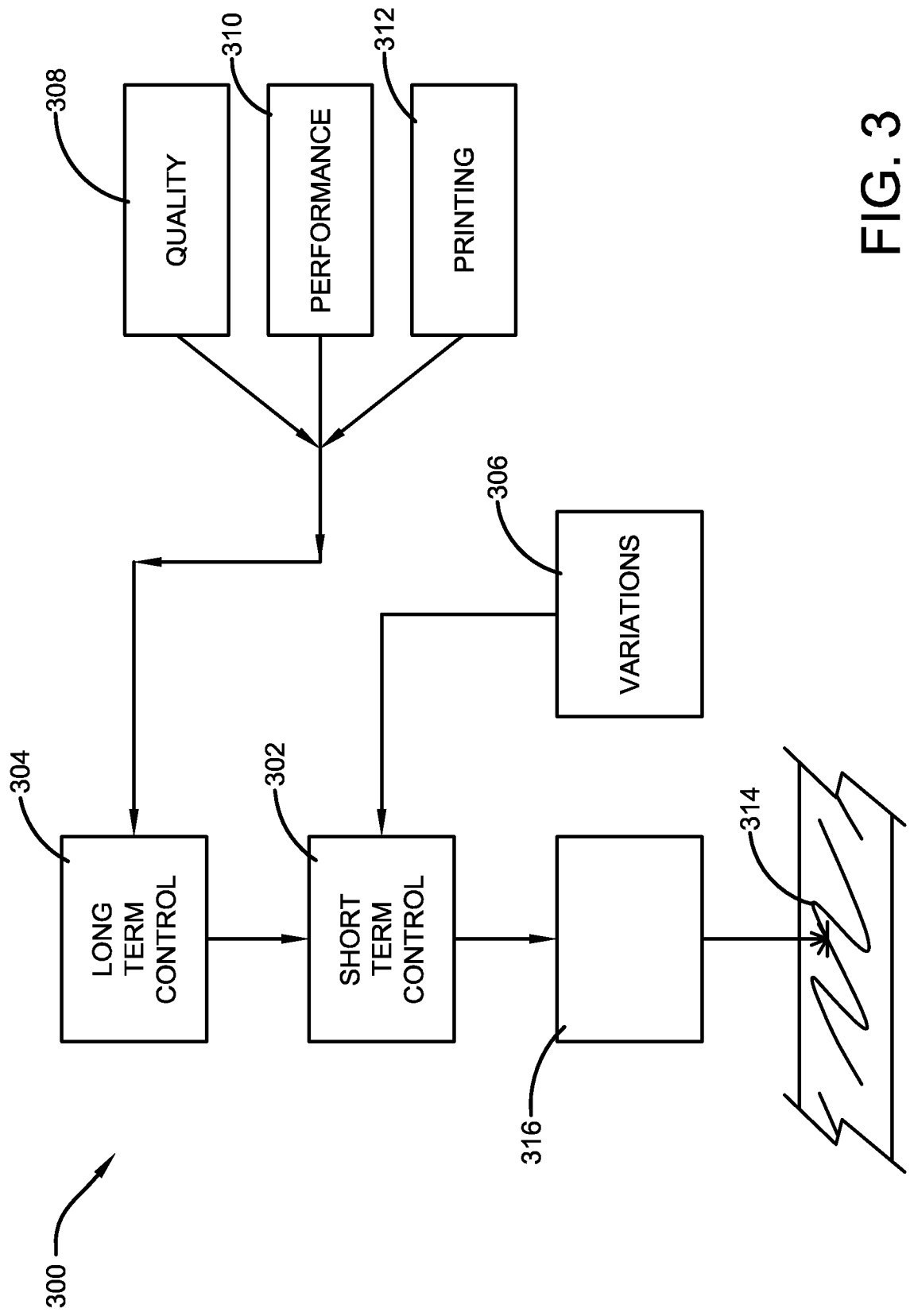
FIG. 3 illustrates a schematic perspective view of the laser cutting system wherein the long term and the short term data are combined and utilized in cutting the antenna in accordance with the disclosed architecture.

As shown in FIG. 3, another embodiment of the present invention may include a laser cutting system 300 that comprises a short term control system 302 and a long term 304 control system that act to control a laser 316 during the cutting process. The result is the fusion or combination of the data from the short term control system 302 and the long term control system 304 to optimize the cutting process of the RFID antenna 314. For example, the information (or data) used may be a combination of immediate (or short term) data to correct short term variations 306 due to such factors as material variations. Further, long term data can be gathered and used to optimize the design to achieve a wanted result such as higher quality 308, increased tag performance 310, more efficient tag printing 312, or any other suitable design result or combination thereof.

Figure 4:
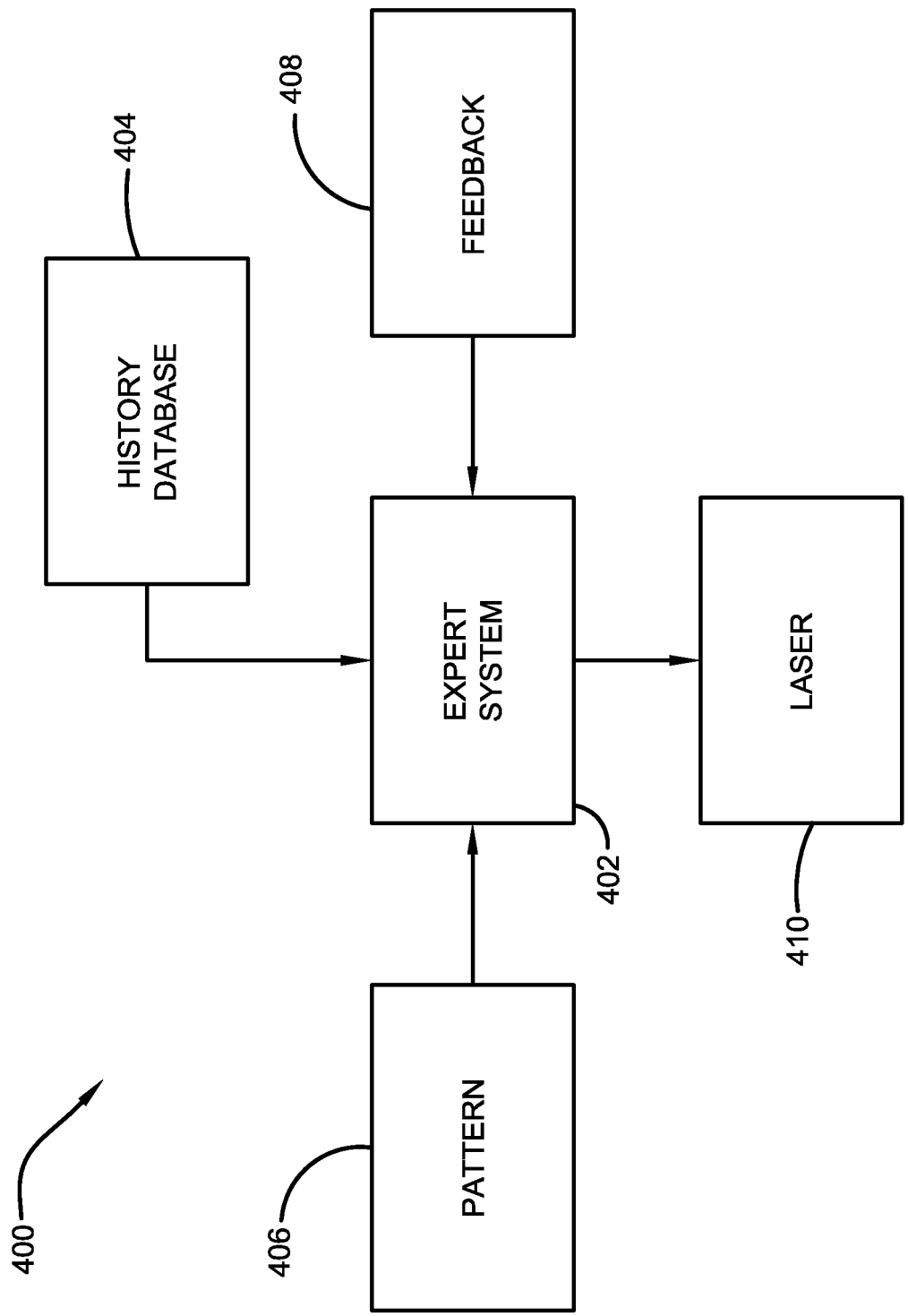
FIG. 4 illustrates a schematic view of the laser cutting system which utilizes an expert system for patterns and feedback in accordance with the disclosed architecture.

In another embodiment shown in FIG. 4, the laser cutting system 400 comprises an expert system 402 that acts to control the laser 410. The expert system 402 may be created from gathering and analyzing results from multiple runs of different RFID antenna designs. The data from these different runs can include pattern data 406, target data, and feedback data 408. The various forms of data can be stored in a history database 404 that would include data from previous runs of different RFID antenna designs. Thus, based on the data from different antenna designs, previous RFID antenna runs, and the corrections used to achieve the wanted physical RFID antenna structure, an adaptive pre-distortion routine can be used to optimize the cutting process. An adaptive pre-distortion routine is where the pattern is changed in a way that reduces the amount of error produced immediately when a run is started, rather than waiting for a correction to stabilize and incur waste.

Figure 5:
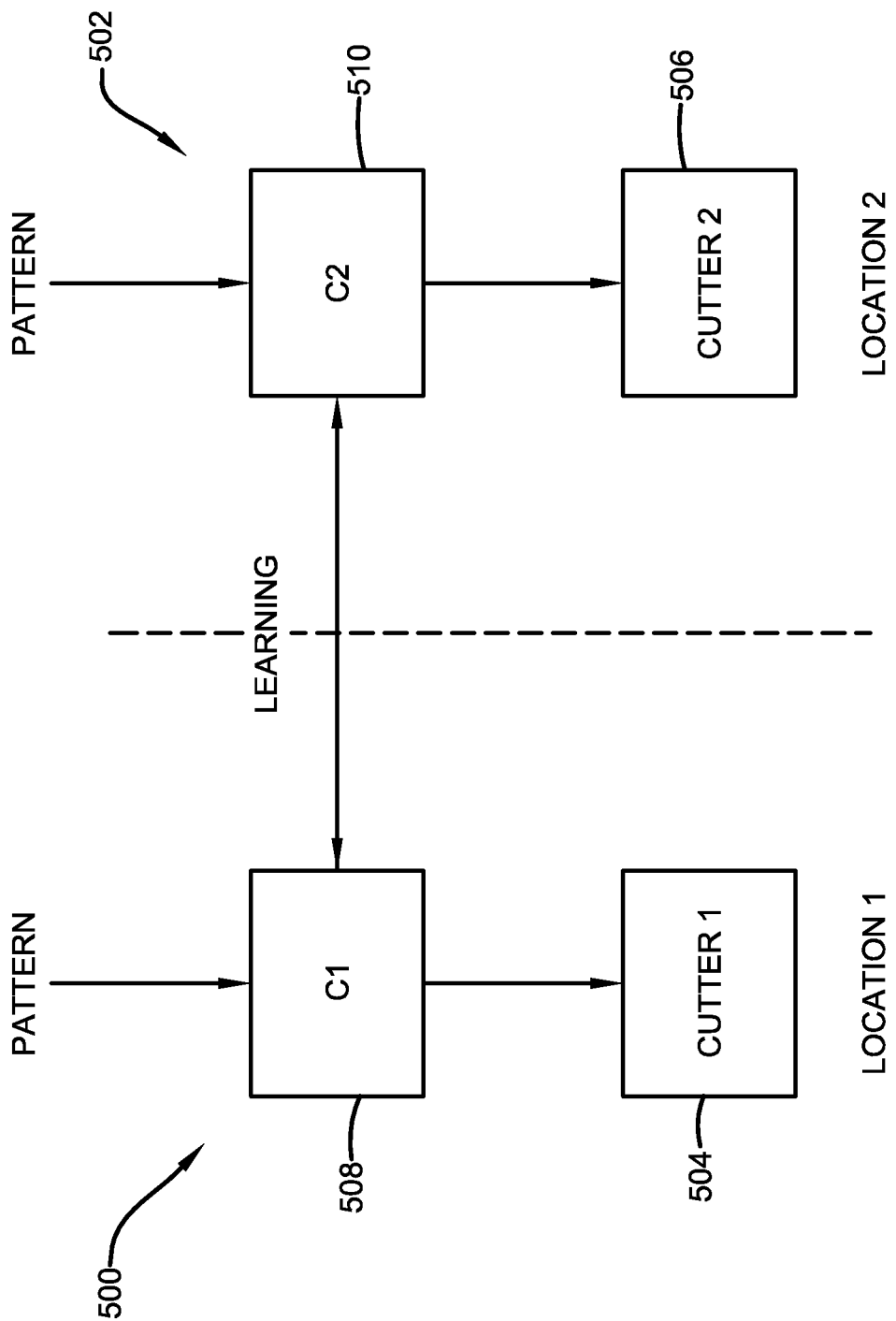
FIG. 5 illustrates a schematic view of a pre-distortion system wherein data from one laser cutting system can be utilized by another laser cutting system in accordance with the disclosed architecture.

As shown in FIG. 5, the method of the present invention may include providing a first laser cutting system 500 having a control system 508 that gathers and analyzes basic correction data from a first cutting process, and a second laser cutting system 502 having a control system 510 that gathers and analyzes basic correction data from a second cutting process. The first laser cutting system 500 may communicate with the second laser cutting system 502 via their respective control systems 508, 510. Specifically, the basic correction data from the first laser cutting system 500 can be used by the second laser cutting system 502 to create a shared pre-distortion system, and vice versa. The data from the first laser cutting system 500 may act as a starter for the optimization routine on the second laser cutting system 502, thereby reducing the time required to converge on a solution. For example, the pattern (first antenna design) on the first laser cutting system 500 is cut by the cutter (laser) 504 of the system 500. The resultant data is then adapted by the second laser cutting system 502 to cut an optimal antenna from the same pattern as the initial pattern in a shorter amount of time via the cutter (laser) 506 of the second system 502. Typically, the data is shared between the laser cutting systems 500 and 502 via a wired or wireless connection between the laser cutting systems 500 and 502, or any other suitable means for communicating data as is known in the art. In this manner, learning is achieved and shared by laser cutting systems 500 and 502.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of adaptive laser cutting control for correction of a cutting pattern comprising:
   operating a laser cutting system comprising a control system and a laser to cut an RFID antenna pattern in a web, wherein the control system comprises a short term control systems and a long term control system;
   utilizing an optical inspection system to compare the RFID antenna pattern produced on the web to a predetermined RFID antenna pattern and generate feedback data; and
   providing the feedback data to the laser cutting system to achieve the predetermined RFID antenna pattern by correction of the RFID antenna pattern, wherein the feedback data is utilized by an adaptive algorithm of the control system, and
   wherein the predetermined RFID antenna pattern is obtained based on the feedback data and at least one of a short term data from the short term control system and a long term data from the long term control system.

2. The method of claim 1, wherein the control system provides cutting instructions to the laser.

3. The method of claim 1, wherein the control system provides modified cutting instructions to the laser in response to the feedback data.

4. The method of claim 1, further comprising a data gathering system.

5. The method of claim 1 further comprising an expert system and an adaptive pre-distortion routine, wherein the expert system is comprised of the feedback data from multiple operations of the laser cutting system.

6. The method of claim 1 further comprising a second laser cutting system, wherein the second laser cutting system utilizes the feedback data generated by the optical inspection system of the laser cutting system to improve the performance of the second laser cutting system.

7. A laser cutting system comprising:
   a control system comprising a short term control system and a long term control system;
   a laser for cutting an RFID antenna pattern in a web; and
   an optical inspection system configured to inspect the RFID antenna pattern and provide a feedback data to the control system by comparing the RFID antenna pattern in the web with a desired RFID antenna pattern, wherein the control system is configured with an adaptive algorithm that uses the feedback data to correct the RFID antenna pattern cut in the web, and wherein a short term data of the short term control system and a long term data of the long term control system are combined to optimize the laser and ensure that the desired pattern is achieved by the laser cutting system.

8. The laser cutting system of claim 7 wherein the control system comprises an inspection data system and a data gathering system for adjusting the laser.

9. The laser cutting system of claim 7 wherein the adaptive algorithm is operated on a remote computer system.

10. A laser cutting system comprising:
    a laser for cutting an RFID antenna pattern in a web; and
    a control system comprised of an inspection data system, a data gathering system, a short term control system and a long term control system, wherein output data from the inspection data system, the data gathering system, the short term control system and the long term control system are used to correct the RFID antenna pattern cut in the web.

11. The laser cutting system of claim 10 wherein the control system inspects and gathers data on a pattern cut by the laser and compares the data to the desired pattern.

12. The laser cutting system of claim 11 further comprising an adaptive algorithm that utilizes the data to adjust the laser.

13. The laser cutting system of claim 10 wherein the laser cutting system communicates with a second laser cutting system.

* * * * *